(12) United States Patent
Asher et al.

(10) Patent No.: US 11,349,660 B2
(45) Date of Patent: May 31, 2022

(54) SECURE SELF-IDENTIFICATION OF A DEVICE

(71) Applicant: Bose Corporation, Framingham, MA (US)

(72) Inventors: David Joshua Asher, Milford, MA (US); Matthew J. Coles, Medway, MA (US); James Lambert, Milford, MA (US); C. Scott Lamb, Marlborough, MA (US); Christopher Daly Vincent, Millbury, MA (US)

(73) Assignee: Bose Corporation, Framingham, MA (US)

( * ) Notice: Subject to any disclaimer, the term of this patent is extended or adjusted under 35 U.S.C. 154(b) by 133 days.

(21) Appl. No.: 16/576,198

(22) Filed: Sep. 19, 2019

(65) Prior Publication Data
US 2021/0091950 A1  Mar. 25, 2021

(51) Int. Cl.
*H04L 9/08* (2006.01)
*H04L 9/32* (2006.01)
*G06F 21/73* (2013.01)

(52) U.S. Cl.
CPC ............ *H04L 9/3213* (2013.01); *G06F 21/73* (2013.01); *H04L 9/0825* (2013.01); *H04L 9/0827* (2013.01); *H04L 9/0877* (2013.01); *H04L 9/3271* (2013.01)

(58) Field of Classification Search
CPC ... H04L 9/3213; H04L 9/0825; H04L 9/0827; H04L 9/0877; H04L 9/3271; G06F 21/73
See application file for complete search history.

(56) References Cited

U.S. PATENT DOCUMENTS

| | | | | |
|---|---|---|---|---|
| 9,220,012 | B1* | 12/2015 | Inamdar | H04L 63/0457 |
| 10,721,224 | B1* | 7/2020 | Sheffield | H04L 63/0876 |
| 2002/0023217 | A1* | 2/2002 | Wheeler | G06Q 20/02 |
| | | | | 713/171 |
| 2008/0189778 | A1* | 8/2008 | Rowley | H04L 63/0823 |
| | | | | 726/9 |
| 2009/0300168 | A1* | 12/2009 | Guo | G06F 21/73 |
| | | | | 709/224 |
| 2015/0134955 | A1* | 5/2015 | Lacaze | H04L 9/0877 |
| | | | | 713/168 |
| 2016/0072808 | A1* | 3/2016 | David | H04L 63/0823 |
| | | | | 713/158 |

(Continued)

OTHER PUBLICATIONS

Alfred J. Menezes, Paul C. van Oorschotand Scott A. Vanstone "Handbook of Applied Cryptography", excerpt p. 403-405 , 1996; (Year: 1996).*

(Continued)

*Primary Examiner* — Catherine Thiaw
(74) *Attorney, Agent, or Firm* — Bond, Schoeneck & King, PLLC

(57) ABSTRACT

A system, method, and computer program product for self-identification of a device. The disclosure utilizes generation of a public/private key pair, within the device itself, and completes at least a portion of an authentication process within the device itself using a securely stored private key that never leaves the device. By not transferring the private key away from the device, potential vulnerabilities of known systems due to transfer of identification information during or after manufacturing is effectively eliminated.

20 Claims, 6 Drawing Sheets

(56) References Cited

U.S. PATENT DOCUMENTS

| | | | |
|---|---|---|---|
| 2016/0248746 A1* | 8/2016 | James | H04L 9/3268 |
| 2016/0254918 A1* | 9/2016 | Liu | H04L 63/0823 |
| | | | 713/156 |
| 2016/0269393 A1* | 9/2016 | Corella | G06F 21/33 |
| 2017/0039568 A1* | 2/2017 | Tunnell | G06F 21/33 |
| 2018/0152441 A1* | 5/2018 | Tamura | H04L 63/0884 |
| 2018/0322311 A1* | 11/2018 | Kobayashi | H04L 51/22 |
| 2019/0036708 A1* | 1/2019 | Fregly | H04W 4/02 |
| 2019/0349348 A1* | 11/2019 | Curtis | H04L 63/0428 |
| 2020/0021448 A1* | 1/2020 | Chumbley | H04L 9/0825 |
| 2020/0252382 A1* | 8/2020 | Peddada, IV | H04L 9/3271 |
| 2021/0051012 A1* | 2/2021 | Law | G06Q 20/4014 |
| 2021/0058392 A1* | 2/2021 | Leddy, III | G06Q 20/401 |
| 2021/0150018 A1* | 5/2021 | Paaredi | G06F 21/44 |

OTHER PUBLICATIONS

M. Jones, B. Campbell, C. Mortimore "JSON Web Token (JWT) Profile for OAuth 2.0 Client Authentication and Authorization Grants", 2015, IETF, 35 pages (Year: 2015).*

* cited by examiner

SECURE SELF-IDENTIFICATION OF A DEVICE

BACKGROUND

This disclosure generally relates to secure methods of identifying a device after manufacture. Devices manufactured and sold in consumer applications, for example, may attempt to utilize the services of a service provider, e.g., may attempt to access content services such as video streaming subscription services, audio streaming subscription services, or any other subscription based service. In systems based on cloud services, piracy of these services by a counterfeit device may result in excessive cost without the benefit of revenue and may impact consumer relationships. Thus, any compromise of a device's digital identity could result in theft of secret information such as WiFi passwords, or theft of subscription-based services. Therefore, service providers need the ability to accurately authenticate the identity of a device prior to providing that device with the services requested, as well as repudiate counterfeits, and track user behaviors with high confidence.

Known methods of authenticating consumer devices include generating identification information associated with a device and transferring that identification information to the device during or immediately following the manufacturing process. However, the integrity of that data transfer may be lacking as any transfer of information in an untrusted environment is open to manipulation, potentially compromising the integrity of the identification systems in place. For example, during manufacture of a device, wired or wireless communications between a device which generates the device identification information and the device for identification may be snooped, manipulated, or replaced prior to the device being sold to customers or end-users, comprising the integrity of known authentication techniques.

SUMMARY OF THE DISCLOSURE

The present disclosure is directed to secure methods of self-identification of a device. Specifically, the systems, methods, and computer program products disclosed herein are directed to generation of identification information, e.g., a public/private key pair, within the device itself, and completing at least a portion of the authentication process within the device itself using a securely stored private key that never leaves the device. By not transferring the private key away from the device, the potential vulnerability to known systems due to transfer of identification information during or after manufacturing is effectively eliminated.

In one example, a device for secure self-identification is provided, the device including at least one processor configured to: generate within the device a private key and a public key, wherein the private and public keys are paired; provide the public key to a registry via a trusted intermediary, the registry having an identification tag associated with the public key; authenticate with a service entity, the service entity having received the public key from the registry. Authentication includes: sending the identification tag to the service entity; receiving a challenge from the service entity, where the challenge is generated based at least in part on the public key of the device; and providing an answer to the service entity based at least in part on the private key in response to the challenge.

In an aspect, the identification tag is generated based at least in part on a MAC address or a hardware serial number of at least one component of the device.

In an aspect, the public and private keys are generated within a Trusted Execution Environment (TEE).

In an aspect, the public and private keys are generated automatically.

In an aspect, the registry is a public repository.

In an aspect, the registry is a repository maintained by a trusted entity.

In an aspect, the public key and the identification tag as associated are unique.

In an aspect, the at least one processor is further configured to generate the identification tag associated with the public key and provide it to the registry when providing the public key via the trusted intermediary.

In an aspect, the service entity is arranged to issue an identity token upon a successful response to the challenge.

In one example, a method for securely identifying a device is provided, the method including: generating, within a device, a private key and a public key, wherein the private key and the public key are paired; providing the public key to a registry via a trusted intermediary, the registry having an identification tag associated with the public key; authenticating the device with a service entity, the service entity having received the public key from the registry; receiving, via the device, a challenge from the service entity, where the challenge is generated based at least in part on the paired public key; providing an answer to the service entity based at least in part on the paired private key in response to the challenge.

In an aspect, the method further includes generating the identification tag based at least in part on a MAC address or hardware serial number of at least one component of the device.

In an aspect, the public key and the private key are generated within a Trusted Execution Environment (TEE).

In an aspect, the public key and the private key are generated automatically.

In an aspect, the registry is a public repository.

In an aspect, the registry is a repository maintained by a trusted entity.

In an aspect, the public key and the identification tag as associated are unique.

In an aspect, the method further includes: generating the identification tag associated with the public key; and providing the identification tag to the registry when providing the public key via the trusted intermediary.

In an aspect, the method further includes issuing, via the registry, an identity token upon a successfully response to the challenge.

In another example, a computer program product stored on a non-transitory computer-readable medium which includes a first set of non-transitory computer-readable instructions for securely identifying a device that when executed on a first processor of the device is arranged to: generate, within the device, a private key and a public key, wherein the private key and the public key are paired; generate or receive an identification tag associated with the device; provide the public key to a registry via a trusted intermediary, the registry having an identification tag associated with the public key; authenticate the device with a service entity, the service entity having received the public key from the registry; receive, via the device, a challenge from the service entity, where the challenge is generated based at least in part on the paired public key; provide an answer to the service entity based at least in part on the paired private key in response to the challenge.

In an aspect, the first processor is further arranged to generate the identification tag associated with the public key; and provide the identification tag to the registry when providing the public key via the trusted intermediary.

These and other aspects of the various embodiments will be apparent from and elucidated with reference to the aspect(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Figure 1:
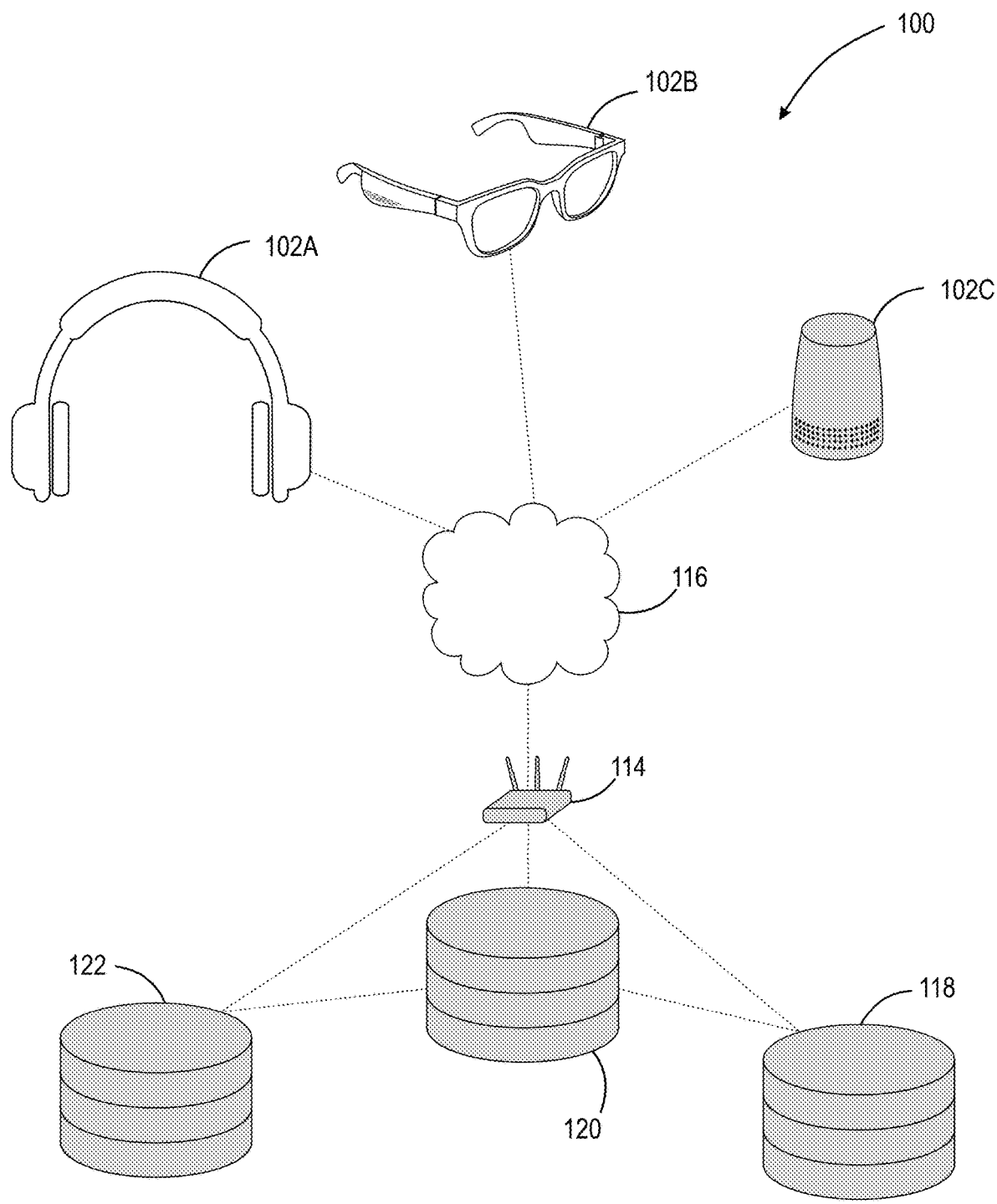
FIG. 1 is a schematic representation of a system according to the present disclosure.

The present disclosure is directed to secure methods of self-identification of a device. Specifically, the systems, methods, and computer program products disclosed herein are directed to generation of identification information, e.g., a public/private key pair, within the device itself, and completing at least a portion of the authentication process within the device itself using a securely stored private key that never leaves the device. By not transferring the private key away from the device, the potential vulnerability to known systems due to transfer of identification information during or after manufacturing is effectively eliminated.

The techniques, methods, and systems provided herein provide numerous benefits. For example, manufacturers will be able to accurately and securely identify a device after manufacture and minimize and/or eliminate potential fraud created by the transfer of identification information in untrusted environments. Additionally, the authentication techniques described herein may also be utilized for secure communication authentication, counterfeit repudiation, non-repudiation of log data or any data from a device, authentication of voice stream or other data stream signing, and/or watermarking for digital media streams.

In the present disclosure, an identification tag (e.g., a digital string of digits and characters) is used to uniquely identify a device from an entire field of other devices under manufacture. A key pair, including a public and private key, is used to authenticate and ensure that the device under consideration is in fact the intended device and could be no other. The key pair is generated within the device itself at the time of manufacture can be used for encryption of sensitive information.

In an example implementation, the device under manufacture includes a trusted execution environment (TEE) or similar technology where the device may store critical secrets such as the private key of the key pair such that the private key is not directly readable by any process except a function within the TEE. This creates significant barriers that make it harder for the private key to be leaked to an authorized agent.

One function within the TEE creates the public key and private key, stores the private key securely within storage of the device, and then publishes the public key for other systems to use. The TEE employs a high entropy Cryptographically Secure Random Number Generator (CSRNG) in combination with a key generation algorithm for key pair creation so that any agent observing a series of public keys can derive no useful knowledge or predictive capability that could be deployed against any other device.

In an example implementation of the systems and methods described herein, the identification tag and the public key are transmitted to a device registration service which may be operated over the internet, e.g., "in the cloud", or some other secure and trusted computing environment, and which will securely store this information in a device registry for later use in an authentication process. When the device is ready to be used, it would request that an authentication (i.e. validation of device identity) be performed by an authentication service which has access to the device registry containing identification tags associated with their respective public keys.

Another function within the TEE would fulfill an authentication challenge from the authentication service by using the private key to unlock a challenge using cryptography methods that do not directly exchange keys but rather exchange secrets that are encrypted by those keys. Successful response to the authentication challenge results in positive identification of the device, which then would permit access of that device to services that are authorized for that device.

Although it is possible to perform this authentication process for every function that requires an authorization check against the device identity, an example implementation will issue a limited-term identity token to the device so that future authorization requests are much faster. One representation of an identity token is a hash code or other unique code that can be used to look up the token information in a common database. Another representation of an identity token is to incorporate all token information directly using a digital signing technology such as a JSON Web Token.

Figure 2:
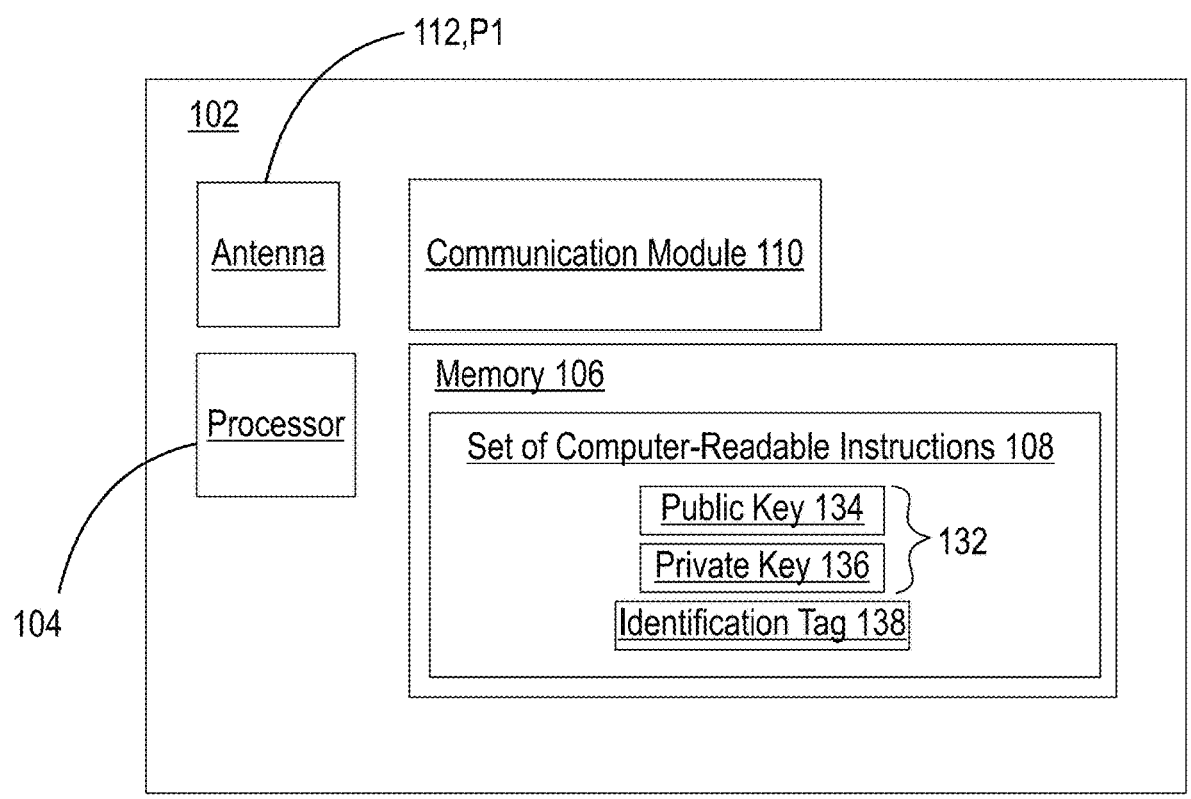
FIG. 2 is a schematic representation of the components of a device according to the present disclosure.

Turning now to the figures, FIG. 1 illustrates a schematic view of system 100. System 100 includes a plurality of devices 102A-102C arranged to communicate with a registry 118, a trusted intermediary 120, and/or a service entity 122 (which will each be discussed below in turn). Although plurality of devices 102A-102C are illustrated as a wearable audio device having an over-the-ear form factor, a wearable audio device having an audio eyeglasses form factor, or a wireless audio device in the form of a stand-alone wireless speaker, respectively, plurality of devices 102A-102C can be selected from any wired or wireless device capable of sending and receiving data as will be discussed herein. As shown in FIG. 2, each device of plurality of devices 102A-102C includes a processor 104 and a non-transitory computer-readable memory 106 arranged to execute and store, respectively, a set of non-transitory computer-readable instructions 108 arranged to perform the functions of plurality of devices 102A-102C as will be discussed below. It should be appreciated that although three devices 102A-102C are illustrated and described herein, only one device is necessary to appreciate the benefits of system 100 as will be described. Additionally, any number of devices greater than three devices can be utilized, for example, 5 devices, 10 devices, 50 devices, 100 devices, etc.

Additionally, each device of plurality of devices 102A-102C can also include a communications module 110 (illustrated in FIG. 2) and an antenna 112 electrically connected to the communications module 110, where the communications module 110 and the antenna 112 are arranged to send and receive wired or wireless data communications using a first protocol P1 between other devices within a local network, for example, via a local router 114 (shown in FIG. 1), or communicate directly to other devices over the internet 116 via first protocol P1. First protocol P1 may be selected from, for example: WiFi (IEEE 802.11 a/b/g/n/ac/e), Bluetooth Classic, Bluetooth Low-Energy (BLE), Radio Frequency Identification (RFID), ZigBee, Z-Wave, 6LoWPAN, Thread, WiFi-ah, 2G, 3G, 4G, 5G, LTE Cat 0, LTE Cat 1, LTE Cat 3, Near Field Communications (NFC), or any other wired or wireless protocol capable of sending and receiving data between each device of plurality of devices 102A-102C and the registry 118, trusted intermediary 120, and/or the service entity 122.

Figure 3B:
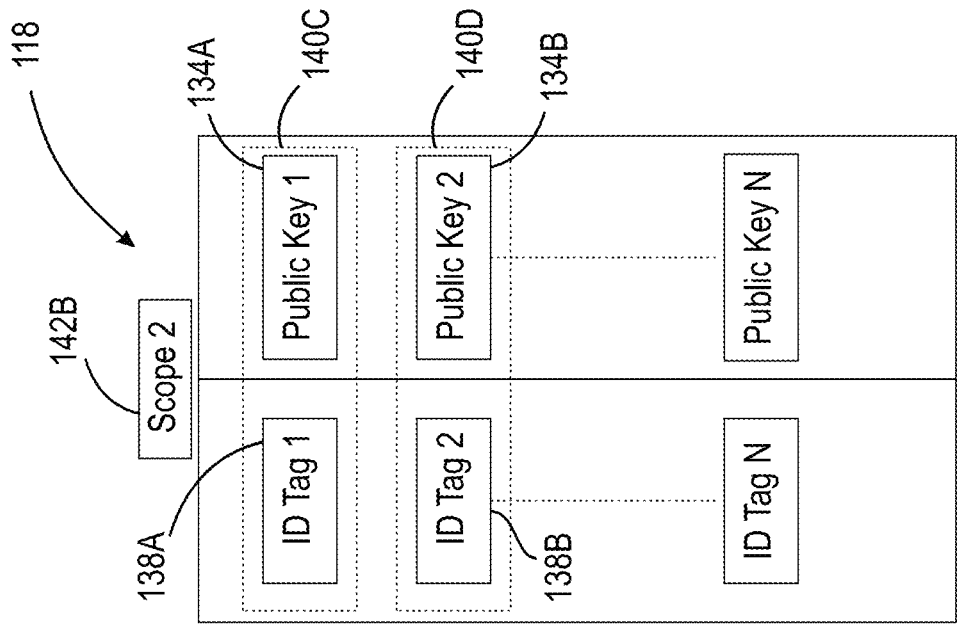
FIG. 3B is a schematic representation of a second scope of a registry according to the present disclosure.
Figure 3A:
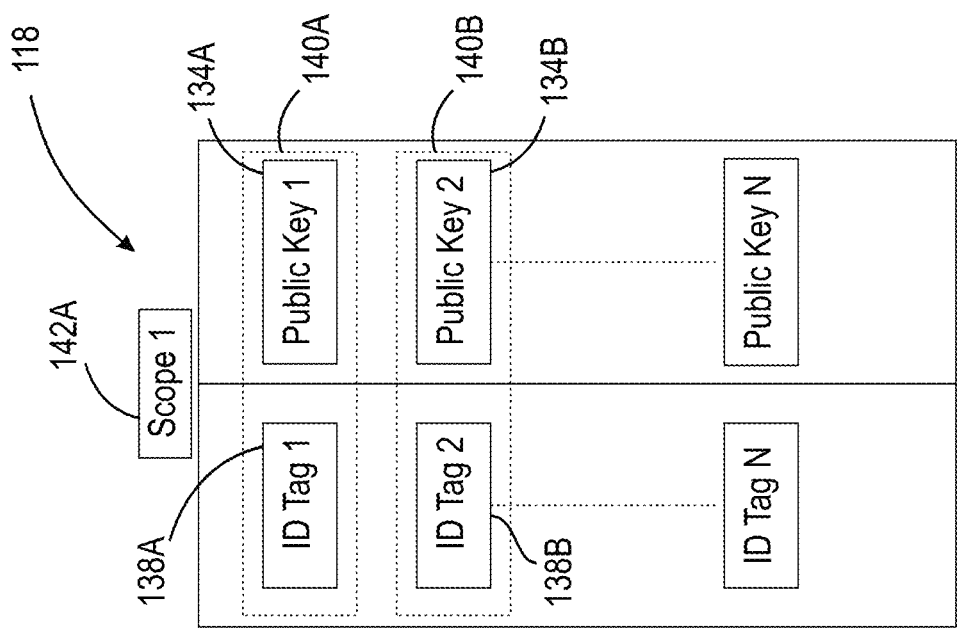
FIG. 3A is a schematic representation of a first scope of a registry according to the present disclosure.

As will be discussed below, in one example, registry 118 is arranged to be central location and/or storage repository for identity information associated with each device identity. The identity information can include a scope 142 (discussed below), public keys 134 (discussed below) as well as identification tags 138 (discussed below) for each device identity within registry 118. Registry 118 may be public in that the information contained within registry 118 may be held open for public inspection and/or published, or remain private in that only certain programs or Application Program Interface (API) calls may access the content within registry 118. These associations or identities can be kept in the form of a simple table as illustrated in FIGS. 3A-3B. Registry 118 is maintained by a trusted entity, e.g., trusted intermediary 120 as will be discussed below or any other entity that can minimize or eliminate manipulation of the data they store and provide to others. In one example, trusted intermediary 120 is intended to be a public service, private service, or other service entity arranged to maintain the integrity of the chain of custody of the identity information, and therefore the integrity of the associations between the public keys 134 of each device and the identification tags 138 of each device from the point of creation until they are securely stored within registry 118. Although discussed throughout the present disclosure as a third-party, it should be appreciated that trusted intermediary 120 can be the same entity that manufactured each device and/or the same entity that controls registry 118. In one example, service entity 122 is intended to be a source, server, company, or other entity capable of providing a service, either through downloadable software or via a cloud-based service to, for example, each device of plurality of devices 102A-102C. For example, service entity 122 can be the provider of an audio streaming subscription service, a video streaming subscription service, or any other software or cloud-based service that utilizes the identities of each device as a means to authenticate genuine devices.

Figure 4:
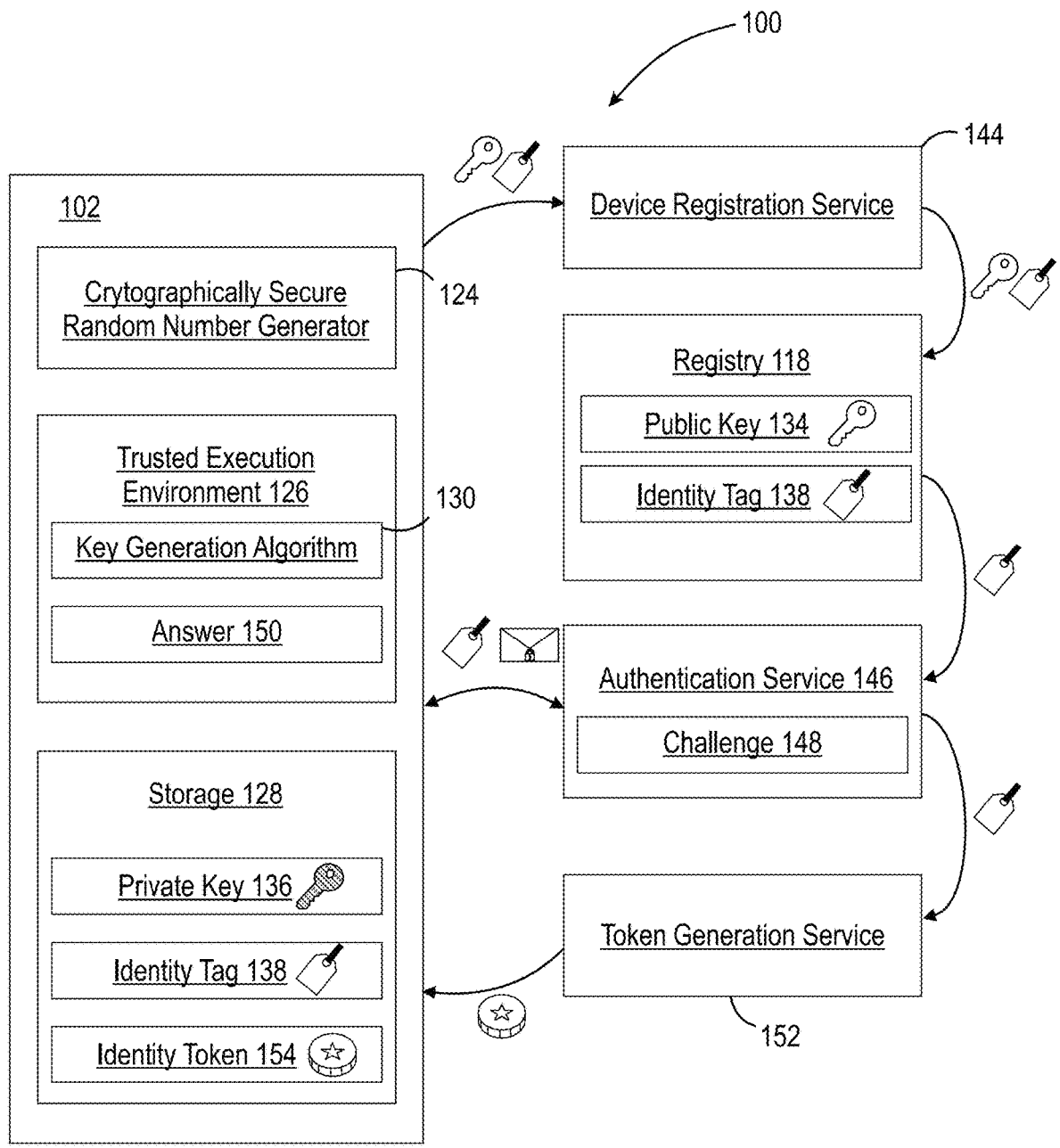
FIG. 4 is a schematic representation of system 100 according to the present disclosure.

As schematically shown in FIG. 4, and as enabled by the sets of non-transitory computer-readable instructions 108 stored and executable within each device of plurality of device 102A-102C, each device may include a Cryptographically Secure Random Number Generator service (CSRNG) 124, a Trusted Execution Environment (TEE) 126, and storage 128. CSRNG 124 is intended to be any program, set of instructions, or algorithm capable of generating random or pseudo-random numbers with high entropy. As will be discussed below, the random numbers generated by CSRNG 124 are utilized by key generation algorithm 130 to generate a key pair 132. The Trusted Execution Environment (TEE) 126 is intended to be a secure and/or dedicated service executable within each device of plurality of devices 102A-102C that is responsible for executing key generation algorithm 130 (discussed below) and for generating a challenge 148 (discussed below) to authenticate the identity of a device using system 100. Storage 128 is intended to be a secure, dedicated portion of non-transitory computer-readable memory 108 or other memory arranged within each device of plurality of devices 102A-102C, and arranged to securely store data corresponding to at least the private key 136 of key pair 132. It should be appreciated that in one example, storage 128 is non-volatile memory, such that any securely stored private key 136 is not compromised by powering down the device. It should be appreciated that storage 128 and/or memory 108 can also be arranged to store public key 134 (discussed below), identification tag 138 (discussed below) and/or identity token 154 (discussed below). Importantly, storage 128 may only be accessed by key generation algorithm 130 (discussed below) and any key operation algorithms (discussed below) such that storage 128 cannot be inspected by an unauthorized process to ensure no manipulation of private key 136 once stored.

Within TEE 126, key generation algorithm 130 is arranged to utilize large integers of numbers randomly or pseudo-randomly generated by CSRNG 124 in the creation or generation of a key pair 132. Key pair 132 includes a public key 134 and a private key 136. The public key 134 and the private key 136 are paired cryptographically or otherwise mathematically based at least in part on the integers generated by CSRNG 124 to form key pair 132. Importantly, from the moment key pair 132 is created for each device, throughout the entire use of system 100, each private key 136 remains secret, i.e., not open to public inspection and never transferred from the memory of each respective device of plurality of devices 102A-102C. By never exposing private key 136 to inspection and never sending, receiving, or otherwise transferring private key 136 to another device, the possibility that the private key 136 may be snooped, sniffed, or otherwise intercepted for manipulation is effectively eliminated, ensuring the integrity of the authentication system discussed below.

In addition to generating key pair 132, each device is assigned an identification tag 138. Each identification tag 138 may be generated by an identification tag generation algorithm with each device, where the identification tag generation algorithm utilizes a series of numbers and/or characters which can be selected and/or generated at least in part based on the Media Access Control (MAC) address or hardware serial number of at least one component part within each device of plurality of devices 102A-102C. For example, each device of plurality of devices 102A-102C can be made of several component parts such as: processor 104 and memory 106; communications module 110, antenna 112, etc. Each of these component parts has a MAC address and/or hardware serial number assigned to it at the time of manufacture. Therefore, processor 104 can be configured to sample or take portions of the MAC addresses and/or hardware serial numbers from each component part to generate an identification tag 138 for each device as a complete unit. It should be appreciated that processor 104 need only sample from one component part within each device of plurality of devices 102A-102C to generate identification tag 138. Additionally, it should be appreciated that identification tag 138 can include, in addition to sampled portions of one or more component parts of the device, additional characters and/or numbers such that a first portion of the identification tag 138 can be generated using one or more sampled portions of the MAC address and/or hardware serial number and a second portion can be generated from a random or pseudo random number generator. It should further be appreciated that identification tag 138 may be generated in whole or in part within TEE 126 of each device or can be generated by an external service or entity, e.g., registry 118, as identification tag 138 can be available to the public as long as private key 136 remains secret. For the purpose of maintaining integrity of the system, either public key 134 and identification tag 138 are generated within each device and sent together from the device to the registry 118 (directly or through trusted intermediary 120); or, when a device attempts to authenticate with registry 118 (discussed below), the registry 118 can generate and send an identification tag 138 to the device and receive the public key 134 for that device in return.

Once key pair 132 and an identification tag 138 are generated for a given device of plurality of devices 102A-102C, the public key 134 and the identification tag 138 can be transferred to registry 118, while the private key 136 is retained and kept secret within TEE 126 or storage 128 within the given device. As shown in FIGS. 3A-3B, a plurality of public keys 134A-134B (collectively referred to as "public key 134" or "public keys 134"), and a plurality of identification tags 138A-138B (collectively referred to as "identification tag 138" or "identification tags 138") can be generated. The transfer of public key 134 and identification tag 138 can be achieved via a wired or wireless connection established with the communications module 110 of a given device of plurality of devices and registry 118 directly or over a connection established through internet 116. Additionally, although this transfer can happen directly, i.e., directly from a device to registry 118, it may also be desirable to transfer this information instead to trusted intermediary 120 who is responsible for maintaining the integrity of the transfer as well as the integrity of the association between the public key 134 and the identification tag 138 within registry 118. As will be discussed below, the association between public key 134 and identification tag 138 within a given scope can form a unique device identity 140A-140D (collectively referred to as device identity 140 or devices identities 140), which can be used to generate a challenge 148 to later confirm the identity of a device.

In one example, as illustrated in FIGS. 3A and 3B, registry 118 can be partitioned or sectioned into a plurality of scopes 142A-142B (collectively referred to as device scope 142 or device scopes 142). Each scope 142 can be selected to represent a particular manufacturer, a particular type of device, or a particular product line of a type of device such that uniqueness is maintained at least within each scope 142. For example, as illustrated in FIG. 3A, a first scope 142A can be established, where first scope 142A corresponds with devices from a particular manufacturer or devices of a particular form factor. During the generation of key pair 132 for each device within first scope 142A, uniqueness is defined as a combination of public key 134 and identification tag 138 that is not already present within first scope 142A. For example, as shown in FIG. 3A, first scope 142A includes a first device identity 140A which has a first public key 134A and a first identification tag 138A. The combination of first public key 134A and first identification tag 138A forms a unique identity 140A, i.e., registry 118 does not already have an association between first public key 134A and first identification tag 138A within first scope 142A. Additionally, first scope 142A can also include a second device identity 140B which has second public key 134B and a second identification tag 138B. Importantly, first device identity 140A and second device identity 140B are unique within first scope 142A.

Similarly, as illustrated in FIG. 3B, a second scope 142B can be established, where second scope 142B corresponds with devices from a particular manufacturer or devices of a particular form factor that are different than the devices of first scope 142A. During the generation of key pair 132 for each device within second scope 142B, uniqueness is defined as a combination of public key 134 and identification tag 138 that is not already present within second scope 142B. For example, as shown in FIG. 3B, second scope 142B includes a third device identity 140C which has first public key 134A and first identification tag 138A. The combination of first public key 134A and first identification tag 138A forms a unique identity 140C within scope 142B, i.e., registry 118 does not already have an association between first public key 134A and first identification tag 138A within second scope 142B. Additionally, second scope 142B can also include a fourth device identity 140D which has second public key 134B and second identification tag 138B. Importantly, although the combination of the first public key 134A and first identification tag 138A, and the combination of the second public key 134B and the second identification tag 138B are not unique within registry 118, third device identity 140C and fourth device identity 140D are unique within second scope 142B. It should be appreciated that although these public keys 134 and identification tags 138 can be mixed and matched, or may be generated as universally unique for each device ever manufactured regardless of scope, uniqueness is only required within each device scope 142.

In one example, as shown in FIG. 4, system 100 can further include a registration service 144 and an authentication service 146. Registration service 144 may be provided by registry 118 and/or trusted intermediary 120 and is responsible for receiving a public key 134 and an identification tag 138 for a particular device and testing it against previous identities within registry 118 or within a particular scope 142 within registry 118 to ensure uniqueness between each device registered. Should a particular combination of public key 134 and identification tag 138 be found to lack uniqueness within registry 118 or within a particular scope 142 within registry 118, the registration service 144 can provide an indication to the device of the plurality of devices 102A-102C to be registered to generate a new key pair 132 or new identification tag 138 (if identification tag 138 is generated within the device, e.g., within TEE 126), or registration service 144 can provide an indication to the entity responsible for generation of identification tag 138 (if the device is not responsible for generation of the identification tag 138) to generate a new tag such that the new resulting combination of public key 134 and identification tag 138 can be retested against previously registered devices for a unique identity within registry 118 or within a particular scope 142 within registry 118. Authentication service 146 is responsible for communicating with registry 118, either directly or through trusted intermediary 120, to retrieve a public key 134, and using public key 134 to generate a challenge 148 (discussed below). Authentication service 146 may be provided by registry 118, trusted intermediary 120, and/or service entity 122 such that upon retrieval of a public key 134 for a particular device authentication service 146 can send challenge 148 to a device or entity requesting authentication and receiving a challenge answer 150 (discussed below) to determine whether the device is authentic and/or genuinely linked to its asserted identity.

As discussed above, authentication service 146 is responsible for generated a challenge 148 and receiving/authenticating a challenge answer 150 provided by a particular device of plurality of devices 102A-102C. Authentication service 146 may generate or receive, e.g., from CSRNG 124, a nonce, i.e., a number generate randomly or pseudo randomly and used only once. Once the nonce is generated, it can be encrypted using the public key 134 associated with a certain device, e.g., associated with a particular device identity 140. The nonce may be a large integer or may be a textually based nonce for encryption. In this way the nonce, once encrypted using the public key 134, becomes the substance of identity 140 the challenge 148. The challenge 148 is then sent to the device to be authenticated, e.g., a device of plurality of devices 102A-102C. The device may then utilize its private key 136 within the TEE 126 to decrypt challenge 148 into a decrypted answer, i.e., answer 150. The answer 150 is then sent back to authentication service 146 which determines if the answer proves that the device is authentic and/or genuine to the asserted device identity 140. If it is, then the authentication service can provide an indication to, for example, service entity 122, that access to a particular service can be granted to the authenticated device. Once the identity 140 of the device is confirmed as authentic and/or genuine, a token generation service 152 can issue a limited term identity token 154 (illustrated in FIG. 4 as a coin symbol) to the device which it can store temporarily of in non-volatile memory, e.g., storage 128, which can be utilized for future authentication processes for increased speed during future authentication requests. In one example, identity token 154 is a hash code or other unique code that can be used to look up the token information in a common database. In another example, identity token 154 is a JSON Web Token.

As illustrated in FIG. 4, during operation of system 100, a device of plurality of devices 102A-102C are created from a series of component parts, each having unique or pseudo unique MAC addresses or hardware serial numbers. Within the TEE 126 during manufacture or shortly thereafter, the device generates key pair 132, which includes public key 134 and private key 136 (illustrated in FIG. 4 by a clear key symbol and a key symbol with cross-hatchings, respectively), using key generation algorithm 130 and CSRNG 124. Additionally, either the device itself or another entity can utilize the MAC addresses and/or the hardware serial numbers of one or more component part to generate identification tag 138 (illustrated in FIG. 4 as a tag symbol). Once generated, public key 134 and identification tag 138 are transferred to a registry 118 directly, or to registry 118 via trusted intermediary 120 (shown in FIG. 1) for registration, while private key 136 remains within the device either within TEE 126 or within storage 128. Trusted intermediary 120 and/or registry 118 utilize device registration service 144 to check whether the combination of public key 134 and identification tag 138 are unique within registry 118 and/or are unique within a scope 142 of registry 118 as discussed with respect to FIG. 3. If the combination is not unique, i.e., a unique identity 140, an indication may be sent back to the device and/or entity to regenerate the key pair 132 or the identification tag 138 and the registration service 144 can re-attempt to register the new identity 140. If the original identity or the new identity are able to be registered, e.g., are unique within registry 118 and/or unique within a scope 142 within registry 118, then the unique identity 140 is registered and stored. At a later point in time, e.g., after manufacturing and after a user has purchased or otherwise acquired the device, the user can attempt to utilize a service from service entity 122, e.g., an audio streaming subscription-based service. Service entity 122 can utilize authentication service 146 to generate a nonce and/or a challenge 148 (illustrated in FIG. 4 as a locked envelope) which utilizes an encrypted nonce. Service entity 122 can then send the challenge 148 to the device to be authenticated. The device, if truly authentic, will utilize private key 136 to decrypt the encrypted nonce, i.e., decrypt the challenge 148 into an answer 150. The answer 150 is then sent back to the authentication service where the authentication service 146 determines if the answer 150 is correct (indicating that the device is genuine). Once the identity 140 has been authenticated, a token generation service 152 can then generate a limited term identity token 154 which can be stored with the device for quick authentication in future interactions with, for example, service entity 122.

Figure 5:
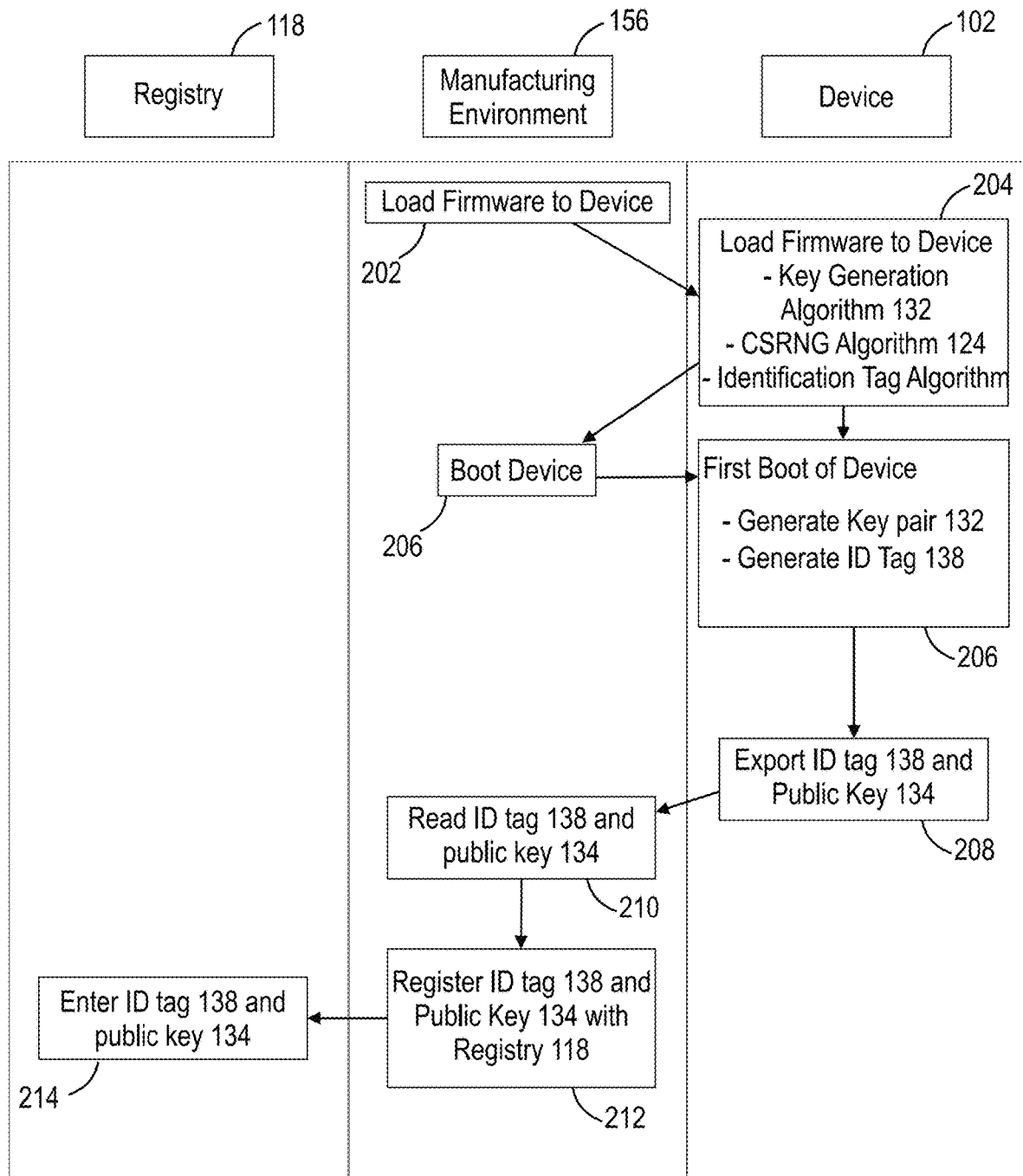
FIG. 5 is a temporal and spatial flow chart of the steps of a method according to the present disclosure.

Additionally, FIG. 5 illustrates a temporal and spatial flow chart of the series of steps discussed above with additional detail. Within FIG. 5, three environments are illustrated, i.e., the registry 118, a manufacturing environment 156, and an exemplary device utilizing the methods disclosed herein. In addition to spatial illustration of the various environments above, a progression from the top of the page to the bottom of page within each environment corresponds with a temporal progression through time during the manufacturing process. As illustrated, the first step in system 100 (step 202) is to load a firmware set or a set of firmware instructions to the device such that it may proceed to a boot process using the various algorithms discussed above. In step 204, the loaded firmware is then stored in the device which includes instructions for use of key generation algorithm 130, CSRNG 124, and the identification tag generation algorithm described above. From there, step 206 includes booting the device within the manufacturing environment. As illustrated this could also be the first boot sequence for device 102. Upon this initial boot in step 206, device 102 generates, using the algorithms discussed above, key pair 132 and identification tag 138. Although not illustrated, it should also be appreciated that identification tag can be generated by another entity, e.g., registry 118, and transferred to device 102. At step 208, device 102 exports identification tag 138 and public key 134 generated in step 206, which are read by a device within the manufacturing environment 156, e.g., at step 210. The registration service 144 or trusted intermediary may then register (step 212) and enter (step 214) the identification tag 138 and the public key with the registry if the device identity 140 is unique within the registry 118 or unique within a scope 142 of the registry 118. The registration with register 118 may also utilize authenticated communications between the devices and entities discussed above, e.g., the communications may utilizes Secure Socket Layer (SSL) authentication, Transport Layer Security (TLS) authentication, or Mutual TLS authentication, etc., to maintain the integrity and relative privacy of these communications.

Figure 6:
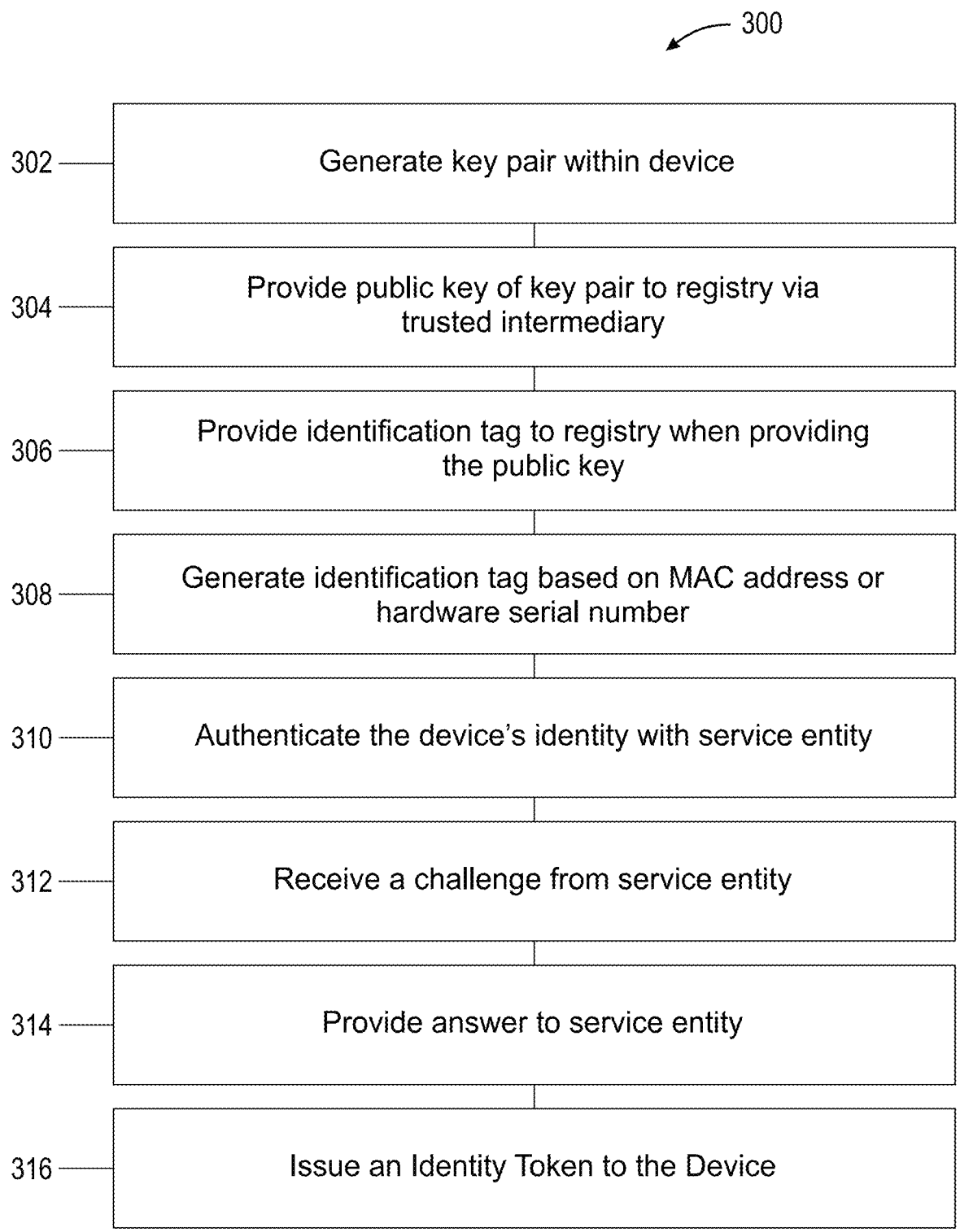
FIG. 6 is a flow chart illustrating the steps of a method according to the present disclosure.

FIG. 6 illustrates an example of method 300. Method 300 can include, for example: generating, within a device 102, a private key 136 and a public key 134, wherein the private key 136 and the public key 134 are paired (step 302); providing the public key 134 to a registry 118 via a trusted intermediary 120, the registry 118 having an identification tag 138 associated with the public key 134 (step 304). Additionally, the identification tag 138 may be generated and provided to the registry 118 when providing the public key 134 via the trusted intermediary 120 (step 306); and the identification tag 138 can be based at least in part on a MAC address or hardware serial number of at least one component of the device 102 (step 308) Method 300 can further include, for example: authenticating the device 102 with a service entity 122, the service entity 122 having received the public key 134 from the registry 118 (step 310); receiving, via the device 102, a challenge 148 from the service entity 122, where the challenge 148 is generated based at least in part on the paired public key 134 (step 312); providing an answer 150 to the service entity 122 based at least in part on the paired private key 136 in response to the challenge 148 (step 314) and issuing, via the registry 118, an identity token 154 upon a successfully response to the challenge 148 (step 316).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A device for secure self-identification, the device comprising:
   at least one processor and at least one memory, configured to execute and store respectively, a set computer-readable instructions, that when executed by the processor are
   configured to:
   generate within the device a private key and a public key, wherein the private and public keys are paired;
   provide the public key to a registry via a trusted intermediary, the registry having an identification tag associated with the public key;
   authenticate with a service entity, the service entity having received the public key from the registry, the authentication comprising:
   sending the identification tag to the service entity;
   receiving, via the device, a challenge from the service entity, wherein the challenge is generated based at least in part on the public key of the device;
   providing, via the device, an answer to the service entity in response to the challenge, wherein the answer is based at least in part on the private key; and
   issuing an identity token to the device upon a successful response to the challenge, wherein the identity token identifies the device as authentic; and
   upon successful authentication of the device, play back audio corresponding to an audio stream provided by the service entity.

2. The device of claim 1, wherein the identification tag is generated based at least in part on a MAC address or a hardware serial number of at least one component of the device.

3. The device of claim 1, wherein the public and private keys are generated within a Trusted Execution Environment (TEE).

4. The device of claim 1, wherein the public and private keys are generated automatically.

5. The device of claim 1, wherein the registry is a repository maintained by a trusted entity.

6. The device of claim 1, wherein the public key and the identification tag as associated are unique.

7. The device of claim 1, wherein the at least one processor is further configured to generate the identification tag associated with the public key and provide it to the registry when providing the public key via the trusted intermediary.

8. The device of claim 1, wherein the identity token is a limited-term identity token, a hash code corresponding to token information stored in a common database, or a JSON web token incorporating token information.

9. The device of claim 1, wherein the processor is further configured to, upon successful authentication of the device, playback audio corresponding to an audio stream provided by the service entity.

10. A method for securely identifying a device, comprising:
  generating, within the device, a private key and a public key, wherein the private key and the public key are paired;
  providing the public key to a registry via a trusted intermediary, the registry having an identification tag associated with the public key;
  authenticating the device with a service entity, the service entity having received the public key from the registry;
  receiving, via the device, a challenge from the service entity, wherein the challenge is generated based at least in part on the paired public key;
  providing, via the device, an answer to the service entity in response to the challenge, wherein the answer is based at least in part on the paired private key; and
  issuing, via a token generation service, an identity token to the device upon a successful response to the challenge, wherein the identity token identifies the device as authentic; and
  upon successful authentication of the device, play back audio corresponding to an audio stream provided by the service entity.

11. The method of claim 10, further comprising:
  generating the identification tag based at least in part on a MAC address or hardware serial number of at least one component of the device.

12. The method of claim 10, wherein the public key and the private key are generated within a Trusted Execution Environment (TEE).

13. The method of claim 10, wherein the public key and the private key are generated automatically.

14. The method of claim 10, wherein the registry is a repository maintained by a trusted entity.

15. The method of claim 10, wherein the public key and the identification tag as associated are unique.

16. The method of claim 10, further comprising:
  generating the identification tag associated with the public key; and
  providing the identification tag to the registry when providing the public key via the trusted intermediary.

17. The method of claim 10, wherein the device is an audio device further configured to, upon successful authentication of the device, playback audio corresponding to an audio stream provided by the service entity.

18. A computer program product stored on a non-transitory computer-readable medium which includes a first set of computer-readable instructions for securely identifying a device that when executed on a first processor of the device is arranged to:
  generate, within the device, a private key and a public key, wherein the private key and the public key are paired;
  generate or receive an identification tag associated with the device;
  provide the public key to a registry via a trusted intermediary, the registry having an identification tag associated with the public key;
  authenticate the device with a service entity, the service entity having received the public key from the registry;
  receive, via the device, a challenge from the service entity, wherein the challenge is generated based at least in part on the paired public key;
  provide, via the device, an answer to the service entity in response to the challenge, wherein the answer is based at least in part on the paired private key; and
  issuing, via a token generation service, an identity token to the device upon a successful response to the challenge, wherein the identity token identifies the device as authentic; and
  upon successful authentication of the device, play back audio corresponding to an audio stream provided by the service entity.

19. The computer program product of claim 18, wherein the first processor is further arranged to:
  generate the identification tag associated with the public key; and
provide the identification tag to the registry when providing the public key via the trusted intermediary.

20. The computer program product of claim 18, wherein the device is an audio device further configured to, upon successful authentication of the device, playback audio corresponding to an audio stream provided by the service entity.

* * * * *